US010997263B1

(12) United States Patent
Rabin

(10) Patent No.: US 10,997,263 B1
(45) Date of Patent: May 4, 2021

(54) SEAMLESS RESOURCE CONSUMPTION WITH EFFICIENT CACHING PROVIDING REDUCED LAG TIME

(71) Applicant: CyberArk Software Ltd., Petach-Tikva (IL)

(72) Inventor: Niv Rabin, Petach-Tikva (IL)

(73) Assignee: Cyber Ark Software Ltd., Petach-Tikva (IL)

( * ) Notice: Subject to any disclaimer, the term of this patent is extended or adjusted under 35 U.S.C. 154(b) by 0 days.

(21) Appl. No.: 17/070,182

(22) Filed: Oct. 14, 2020

(51) Int. Cl.
*G06F 16/957* (2019.01)
*G06F 12/0862* (2016.01)
*G06F 16/172* (2019.01)
*G06F 9/50* (2006.01)
*G06F 9/30* (2018.01)

(52) U.S. Cl.
CPC ...... *G06F 16/9574* (2019.01); *G06F 9/30047* (2013.01); *G06F 9/5016* (2013.01); *G06F 12/0862* (2013.01); *G06F 16/172* (2019.01)

(58) Field of Classification Search
None
See application file for complete search history.

(56) References Cited

U.S. PATENT DOCUMENTS

| 6,018,789 A | * | 1/2000 | Sokolov | G06F 3/061 |
| | | | | 711/113 |
| 10,613,735 B1 | * | 4/2020 | Karpe | G06F 3/0485 |
| 2017/0329862 A1 | | 11/2017 | Parker et al. | |

OTHER PUBLICATIONS

Wikipedia, "Database Caching," accessed Oct. 13, 2020, 3 pages, https://en.wikipedia.org/wiki/Database_caching.
Lam, P., "Infinite Scroll'ing the right way," Walmart Global Tech Blog, Medium, Apr. 2, 2019, 10 pages https://medium.com/walmartglobaltech/infinite-scrolling-the-right-way-11b098a08815.
Wikipedia, "Streaming Data," accessed Oct. 13, 2020, 6 pages, https://en.wikipedia.org/wiki/Streaming_data.

* cited by examiner

*Primary Examiner* — Qing Yuan Wu
(74) *Attorney, Agent, or Firm* — Finnegan, Henderson, Farabow, Garrett & Dunner, LLP

(57) ABSTRACT

Disclosed embodiments relate to systems and methods for reducing lag time for progressive consumption of data content. Techniques include receiving an indication of requested data, the indication comprising: a data chunk size, and a number of data chunks, accessing a data cache, and performing a fetching operation comprising at least one of: if the data cache is empty, obtaining a first portion of the requested data from a database, or if the data cache is not empty, determining whether at least the first portion of the requested data is available in the data cache. Further techniques include providing for consumption the first portion of the data, identifying that a threshold has been reached, receiving updated values for the data chunk size and the number of data chunks, performing the fetching operation again based on the updated values, and providing for consumption a second portion of the requested data.

20 Claims, 6 Drawing Sheets

SEAMLESS RESOURCE CONSUMPTION WITH EFFICIENT CACHING PROVIDING REDUCED LAG TIME

BACKGROUND

With the increased usage of web and cloud-based data storage solutions, as well as increased popularity of data and multimedia streaming services, there is an increasing need for seamless and efficient data transfer and consumption. Conventional methods of caching data locally on a client machine may cause a lag time between reaching the end of the cached data and retrieving new data from a remote data source to be viewed or otherwise consumed by the client. This lag time may be especially noticeable in the context of scrolling through viewable data (e.g., web pages, intranet pages, etc.), application interfaces, content streaming (e.g., audio, video, etc.), and other forms of data consumption. The lag time may seriously detract from the user's experience. In other cases, a lag time may slow down computing processes, resulting in unnecessary consumption of time and resources.

Accordingly, in view of these and other deficiencies in existing techniques, technological solutions are needed for progressive consumption of data with efficient caching. Solutions should advantageously reduce any lag time experienced by a user or process when consuming data content stored in a remote location.

SUMMARY

The disclosed embodiments describe non-transitory computer readable media, systems, and methods for reducing lag time for progressive consumption of data content. For example, in an exemplary embodiment, there may be a non-transitory computer readable medium including instructions that, when executed by at least one processor, cause the at least one processor to perform operations for reducing lag time for progressive consumption of data content. The operations may comprise receiving an indication of requested data content, the indication comprising: a data chunk size, and a number of data chunks to fetch; accessing, in response to the indication, a data content cache; performing a fetching operation comprising at least one of: if the data content cache is empty, obtaining at least a first portion of the requested data content from a content database, or the data content cache is not empty, determining whether at least the first portion of the requested data content is available in the data content cache; providing for consumption, based on the fetching operation, at least the first portion of the requested data content; identifying that a threshold has been reached based on the consumption; receiving, based on the identification that the threshold has been reached, updated values for the data chunk size and the number of data chunks to fetch; performing the fetching operation again based on the updated values; providing for consumption, based on the fetching operation performed again, at least a second portion of the requested data content.

According to a disclosed embodiment, the data chunk size may be expressed by at least one of: file size or duration.

According to a disclosed embodiment, the threshold may be reached based on scrolling activity in a webpage or application.

According to a disclosed embodiment, the threshold may be reached based on a streaming duration.

According to a disclosed embodiment, the consumption may occur in a webpage.

According to a disclosed embodiment, the consumption may occur as part of a command line interface process for data retrieval.

According to a disclosed embodiment, the consumption may occur as part of a multimedia streaming process.

According to a disclosed embodiment, the threshold may be determined to be reached based on whether the data content cache is full.

According to a disclosed embodiment, the threshold may be determined to be reached based on a number of data chunks remaining in the data content cache.

According to a disclosed embodiment, the threshold may be variable based at least in part on a connection strength used for the consumption.

According to another disclosed embodiment, a method may be implemented for reducing lag time for progressive consumption of data content. The method may comprise receiving an indication of requested data content, the indication comprising: a data chunk size, and a number of data chunks to fetch; accessing, in response to the indication, a data content cache; performing a fetching operation comprising at least one of: if the data content cache is empty, obtaining at least a first portion of the requested data content from a content database, or the data content cache is not empty, determining whether at least the first portion of the requested data content is available in the data content cache; providing for consumption, based on the fetching operation, at least the first portion of the requested data content; identifying that a threshold has been reached based on the consumption; receiving, based on the identification that the threshold has been reached, updated values for the data chunk size and the number of data chunks to fetch; performing the fetching operation again based on the updated values; providing for consumption, based on the fetching operation performed again, at least a second portion of the requested data content.

According to a disclosed embodiment, the data chunk size may be expressed by at least one of: file size or duration.

According to a disclosed embodiment, the threshold may be reached based on scrolling activity in a webpage or application.

According to a disclosed embodiment, the threshold may be reached based on a streaming duration.

According to a disclosed embodiment, the consumption may occur in a webpage.

According to a disclosed embodiment, the consumption may occur as part of a command line interface process for data retrieval.

According to a disclosed embodiment, the consumption may occur as part of a multimedia streaming process.

According to a disclosed embodiment, the threshold may be determined to be reached based on a determination of whether the data content cache is full.

According to a disclosed embodiment, the threshold may be determined to be reached based on a number of data chunks remaining in the data content cache.

According to a disclosed embodiment, the threshold may be variable based at least in part on a connection strength used for the consumption.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

The techniques of seamless resource consumption with efficient caching providing reduced lag time described herein overcome several technological problems relating to efficiency and user-friendliness of data communications and data consumption. A user may wish to stream a large amount of data from a remote location, such as a web server. While conventional approaches may implement traditional data caching, these may result in a lag time between the consumption of the previously cached data and the loading of the next portion of data. This lag time may significantly reduce the quality of a user's experience while consuming the data (for example, while streaming a movie or scrolling through a large data table in a web page). The lag time may also negatively affect computing processes that implement these techniques by slowing down the execution of the processes.

Disclosed embodiments provide techniques for seamless data consumption and reduction of lag time by monitoring data consumption and reloading a data cache before all of the cached has been consumed. This can be achieved by "chunking" the requested data into smaller portions and providing the data and loading the data into the cache in chunks. Then, when a certain threshold amount of data chunks are consumed, the cache may be reloaded, while the remaining data in the cache is being consumed. Thus, the lag time caused by conventional approaches may be eliminated because when a certain threshold is reached, new data may be fetched preemptively.

Reference will now be made in detail to the disclosed embodiments, examples of which are illustrated in the accompanying drawings.

Figure 1:
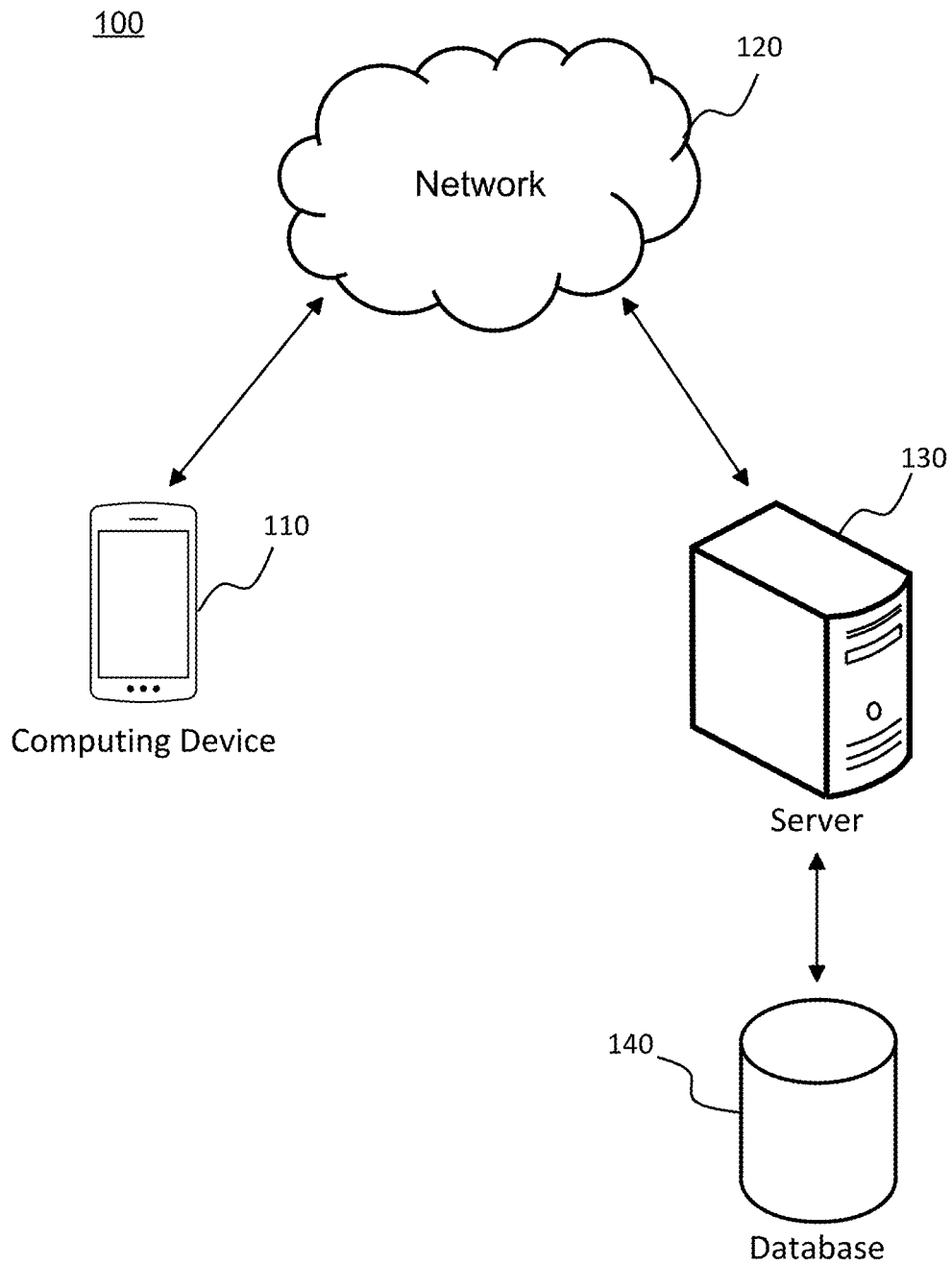
FIG. 1 is a block diagram of an exemplary system for reducing lag time for progressive consumption of data content, in accordance with disclosed embodiments.

FIG. 1 is a block diagram of an exemplary system for reducing lag time for progressive consumption of data content. System 100 may include one or more computing devices 110, a network 120, one or more servers 130, and one or more databases 140, as shown in FIG. 1.

Computing device 110 may include a variety of different types of computing devices, including those capable of communicating over a network. For example, computing device 110 may be a personal computer (e.g., a desktop or laptop), an IoT device (e.g., sensor, smart television or other home appliance, printer, connected vehicle, industrial device, etc.), a server, a vehicle-based or aircraft-based computer, a virtual machine (e.g., virtualized computer, container instance, etc.), or other device. Computing device 110 may also be a handheld device (e.g., a mobile phone, a tablet, notebook, etc.), a wearable device (e.g., a smart watch, a head-mounted display, etc.), or other device capable of processing and/or receiving data.

In certain embodiments, computing device 110 may be a terminal-based (e.g., Unix or Linux) computing device. For example, the computing device 110 may provide only a terminal interface for interacting with the system. In some embodiments, by contrast, computing device 110 may operate using a visual operating system, such as a Windows™ operating system, Apple™ operating system, Android™ operating system, a cloud-based operating system (e.g., through AWS™, Azure™, IBM Cloud™, etc.), or other types of non-terminal operating systems. Computing device 110 is described in greater detail below with respect to FIG. 2.

Computing device 110 may be in communication with server 130 over network 120. Such communications may take place across various types of networks, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, a nearfield communications technique (e.g., Bluetooth, infrared, etc.), or various other types of network communications. In some embodiments, the communications may take place across two or more of these forms of networks and protocols.

Server 130 may be configured to process and manage requests for data from other devices within system 100, for example, computing device 110. In some embodiments, server 130 may be associated with a website, data streaming service, cloud computing server, data storage service, or other service or organization that may stream data to a user's device. As non-limiting examples, server 130 may be associated with a cloud data storage service (e.g., Amazon Cloud File Storage™ or others), a video streaming service (e.g., Netflix™, YouTube™, Hulu™, or others), or a music streaming service (e.g., Spotify™, Pandora™, Amazon Music™, or others), etc.

Server 130 may also communicate with database 140. Database 140 may comprise a single database, multiple databases, cloud storage, data lake, or other data storage modalities. In some embodiments, database 140 may be storage local to or integrated with server 130. In other embodiments, database 140 may be separate or remote from server 130. Database 140 may store a variety of data in any suitable format. For example, in some embodiments database 140 may be a web server that supplies web content to computing devices 110 or other clients. Further, database 140 may be a content delivery or edge database (e.g., provided by Akamai™ or others). In other embodiments, database 140 may be a multimedia database storing content to be streamed to computing device 110 or other clients (e.g., audio, video, etc.).

In some embodiments, server 130 may be a caching proxy server. For example, server 130 may act as an intermediary between computing device 110 and a server associated with a content provider (e.g., provider of web content, data, audio content, video content, etc.). A caching proxy server may employ a shared cache in which it can store data for forwarding to one or more computing devices 110.

Figure 2:
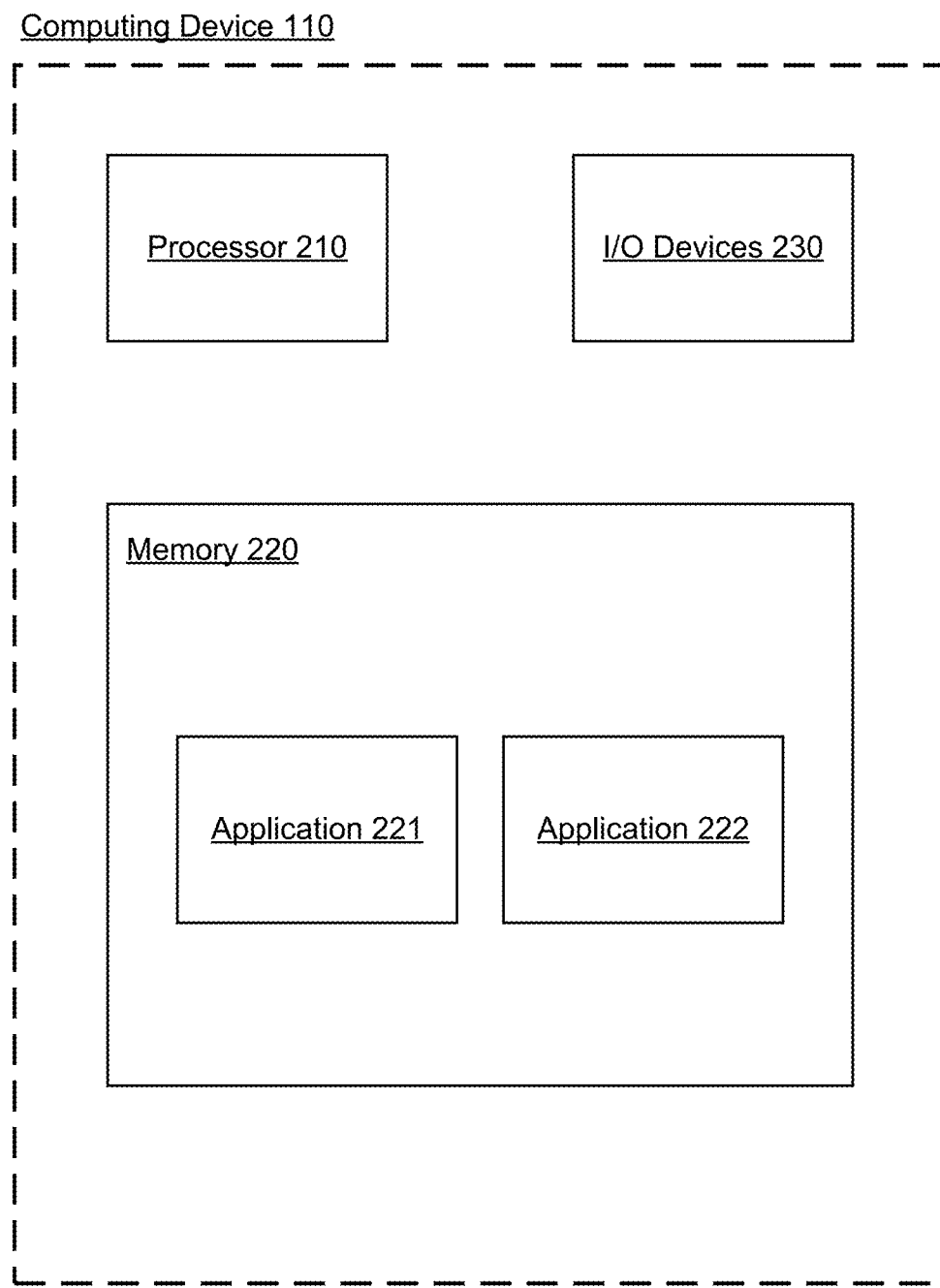
FIG. 2 is a block diagram showing an exemplary computing device 110, in accordance with disclosed embodiments.

FIG. 2 is a block diagram showing an exemplary computing device 110 in accordance with disclosed embodiments. Computing device 110 may include one or more processors 210, one or more memories 220, and one or more input/output (I/O) devices 230. Processor (or processors) 210 may include one or more data or software processing devices. For example, the processor 210 may take the form of, but is not limited to, a microprocessor, embedded processor, or the like, or may be integrated in a system on a chip (SoC). Furthermore, according to some embodiments, the processor 210 may be from the family of processors manufactured by Intel®, AMD®, Qualcomm®, Apple®, NVIDIA®, or the like. The processor 210 may also be based on the ARM architecture, a mobile processor, or a graphics processing unit, etc. The disclosed embodiments are not limited to any type of processor configured in the computing device 110.

Memory (or memories) 220 may include one or more storage devices configured to store instructions used by the processor 210 to perform functions related to the disclosed embodiments. Memory 220 may be configured to store software instructions, such as programs, that perform one or more operations when executed by the processor 210 to provide data for progressive consumption, for example, using method 400, described in detail below. The disclosed embodiments are not limited to particular software programs or devices configured to perform dedicated tasks. For example, the memory 220 may store a single program, such as a user-level application 221 or 222, that performs the functions of the disclosed embodiments, or may comprise multiple software programs. For example, application 221 may be a web browser or other application that a user may utilize to consume streamed data. As another example, application 222 may be a dedicated application for streaming data, for example by executed process 400, as described in greater detail below. Additionally, the processor 210 may in some embodiments execute one or more programs (or portions thereof) remotely located from the computing device 110. Furthermore, the memory 220 may include one or more storage devices configured to store data for use by the programs. In some embodiments, as described above, computing device 110 may operate using an operating system. The operating system may be stored in memory 220.

Memory 220 of computing device 110 may also include a data cache. The data cache may be a dedicated portion of memory 220. In some embodiments, applications 221, 222 may have a dedicated cache.

Input/output devices 230 may include one or more integrated ports or stand-alone devices configured to allow data to be received and/or transferred by the computing device 110. The I/O devices 230 may include one or more network adaptors or communication devices and/or interfaces (e.g., WiFi, Bluetooth®, RFID, NFC, RF, infrared, etc.) to communicate with other machines and devices, such as with other components of system 100 through network 120. In some embodiments, the I/O devices 230 may comprise a touchscreen configured to allow a user to interact with the computing device 110, and in some embodiments, the I/O devices 230 may comprise a keyboard, mouse, trackball, touch pad, stylus, and the like. I/O devices 230 may further include a display, such as an LCD screen, LED screen, OLED screen, plasma screen, or other suitable device to visibly present information to a user.

Figure 3A:
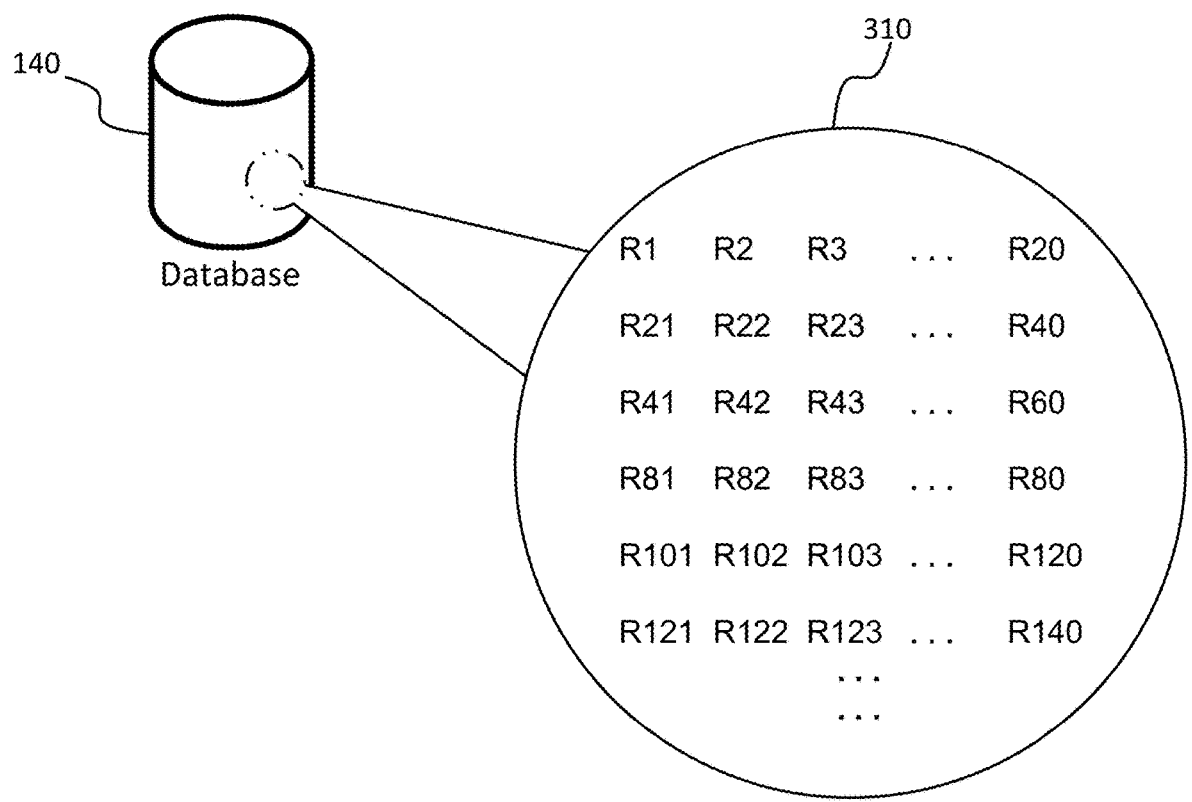
FIG. 3A is an illustration depicting exemplary data content of a database, in accordance with disclosed embodiments.

FIG. 3A is an illustration depicting exemplary data content of a database 140, in accordance with disclosed embodiments. As described above, system 100 may include one or more databases 140. Database 140 may include a variety of types of data 310 in a variety of suitable formats. For example, data 310 may include raw data entries, for example a list of names or phone numbers. As another example, data 310 may be a plurality of files, such as comma-separated value (.csv) files, each individually containing data entries. As yet another example, data 310 may be video data, for example a video file of a movie may be stored on a database associated with a video streaming service. In FIG. 3A, exemplary data 310 is shown as comprising a plurality of data records, R1 through R140. For example, data records R1-R140 may be correspond to data entries of a table, data files, or portions of a video file. Of course, while data 310 is shown as including 140 data records, many fewer or many more pieces of data may be used in different embodiments.

Figure 3B:
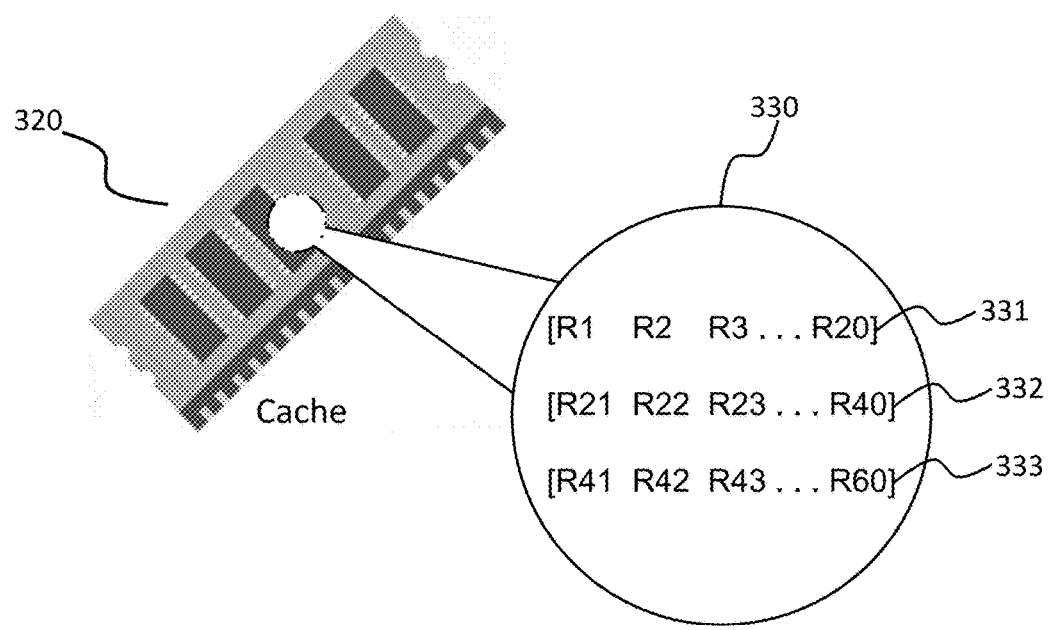
FIG. 3B is an illustration depicting cached data content, in accordance with disclosed embodiments.

FIG. 3B is an illustration depicting cached data content, in accordance with disclosed embodiments. As described in greater detail below, the device executing disclosed methods for data consumption may include a data cache 320. Data cache 320 may be a dedicated memory or portion of memory, for example memory 220 of computing device 110. In some embodiments, data cache 320 may be a cache associated with another hardware component, for example, processor 210. As an example, data cache 320 may be a folder stored within memory 220 containing a collection of cached data associated with a web browser application executed on computing device 110.

Data cache 320 may include cached data 330. For example, as shown in FIG. 3B, cached data 330 may include data records R1-R60. Data cache 320 may be loaded with data from database 140, for example, according to process 400 described in greater detail below. Data from database 140 may be loaded to data cache 320 in data chunks, or in various other data management formats. As used herein, a data chunk may refer to a portion or grouping of data having a certain size, of a certain number of records, or otherwise representing a specific amount of data. For example, a data chunk may be defined as a group of 20 data records or as a 200 KB portion of data, etc. In some embodiments, data chunks may be defined relative to the type of data being portioned. For example, data chunks of a video file may be defined based on time or frames, such as 10 second segments or portions of 600 frames of the video. As another example, an audio file may be chunked based on time. The size of the chunked data portions may be referred to as a chunk size. The chunk size may vary based on the type of data, the application presenting the data, user preferences, the size of data cache 320, the amount of data already stored in the cache, the amount of data already loaded from database 140, the method of data storage of database 140, or other suitable factors. Consistent with disclosed embodiments, chunk size may be manually configurable by a user. In some embodiments, the chunk size may be dynamically updated over time. Loading data cache 320 using data chunks may be helpful to manage the amount of data saved in data cache 320 and discern the amount of data consumed by a user, as described in greater detail below with respect to the process 400.

Referring back to FIG. 3B, data 330 may be loaded into cache 320 as data chunks 331-333. Data chunks 331-333 are shown as having a chunk size of 20 records. For example, data chunk 331 contains records R1-R20, data chunk 332 contains records R21-R40, and data chunk 333 contains records R41-R60.

Figure 4:
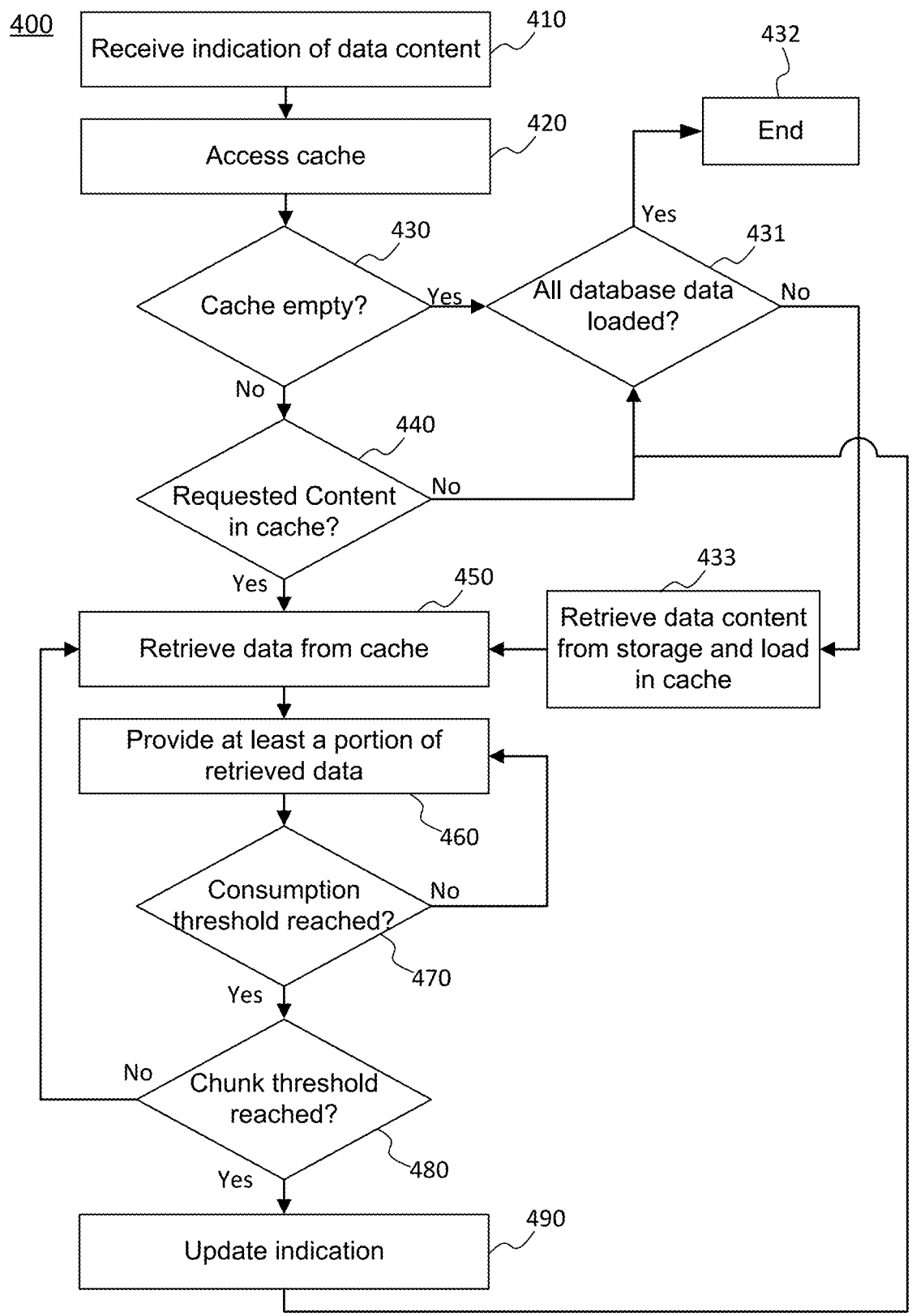
FIG. 4 is a flowchart depicting an exemplary process for reducing lag time for progressive consumption of data content, in accordance with disclosed embodiments.

FIG. 4 is a flowchart depicting an exemplary process for reducing lag time for progressive consumption of data content, in accordance with disclosed embodiments. Process 400 may be implemented, for example by processor 210, shown in FIG. 2. Process 400 could be performed in response to receiving a first portion of data for streaming. As another example, if server 130 is a caching proxy server, process 400 may be implemented by server 130 in response to a request for access to data by client device 110. As yet another example, process 400 or parts of process 400 may be implemented by a dedicated application for resource streaming. In such a case, the dedicated application may work in conjunction with another application that may be implemented by a user to view the data. For example, a dedicated streaming application or browser plugin may act as proxy between a web server and a web browser to provide streamed data to the web browser.

At step 410, process 400 may include receiving an indication of data content. An indication of data content may include an identification of data to be loaded using process 400. For example, an indication of data content may be an identification of data that a user requests to view a specific file or series of files. As another example, an indication of data content may identify a video to be streamed and played on computing device 110. In some embodiments, an indication of data content may be received by receiving a user input. For example, a user may load a webpage including data to be displayed on computing device 110 or select a video to be played by computing device 110.

Data content may include a variety of types of data in a variety of formats. Data content may include data 310 stored in database 140, as described above. For example, data content may include tabular data records, data files, videos, audio files, images, webpages, and other types of data. The indication of data content may identify a starting point for the data. For example, the indication of data content may identify the table or a starting point within a large table for data the user requests to view. As another example, data content may be a streamed video or audio file and the indication of data content may identify the specific video to be streamed and a point within the video at which to start streaming. For example, during a very long video of a seminar, a user may wish to start watching the video one hour in, instead of starting at the beginning.

In some embodiments, an indication of data content may include a data chunk size. As described above, a data chunk may refer to a portion or grouping of data. The size of the data chunk may indicate, for example, a certain number of records or amount of data to be chunked. The data chunk size may be expressed as a file size, a number of data records, an amount of data storage, a duration, or other suitable metric. For example, a data chunk may be defined as a group of 20 data records or as a 200 KB portion of data. In some embodiments, data chunk size may be based on the amount of data capable of being displayed to the user at once. Accordingly, step 410 may include determining a simultaneous data consumption amount. The simultaneous data consumption amount may indicate, for example how much data is able to be displayed to the user at one time, or how many data records a process can use within a certain period of time. This amount may be based on the size of the display of the device, the application displaying the data, the settings of the application displaying the data, user preferences, and other factors.

As described above, the data chunk size may also be based on other factors such as the type of data requested, the application presenting the data, user preferences, the size of data cache 320, the amount of data already stored in the cache, the amount of data already loaded from database 140, the method of data storage of database 140, or other suitable factors. Consistent with disclosed embodiments, chunk size may be manually configurable by a user. In some embodiments, the chunk size may be dynamically updated over time. For example, the chunk size may be updated when the user changes the settings of the application displaying the data (e.g., font size, zoom percentage, or others) or when the user changes the display on which the data is being presented.

In some embodiments, an indication of data content may include a number of data chunks. The number of data chunks may indicate how many data chunks should be fetched from database 140 during one request. Thus, together the chunk size and number of data chunks may define the amount of data to be requested from database 140. For example, the indication of data content may specify that three data chunks, each having a size of 20 data records, are to be loaded and presented to the user. The number of data chunks may be determined based on a variety of factors, including the size of the cache, the speed of the connection, the type of data being streamed, the chunk size, and others.

As an example, in the context of FIGS. 3A and 3B, a user using a web browser may request to view a large table of data containing several hundred or more records. The table may be too large to display all of the data contents at one time. Accordingly, the application may identify a data chunk size based on how much data the user is able to view at one time. For example, if the user is able to view ten records at once, the data chunk size may be determined as twenty. A number of data chunks may also be determined. For example, the number of data chunks to be fetched per request to the database may be three. Accordingly, when the web browser loads the web page, the request to load the webpage from the user's computing device 110 to server 130 may include a request for the first sixty data records of the table, R1 through R60. As illustrated by FIG. 3B, each of the sixty records may then be saved to the cache, in twenty-record data chunks 331-333.

At step 420, process 400 may include accessing a data content cache. As described above, a data cache may include various stored data records. Data cache 320 may be a dedicated memory or portion of memory, for example memory 220 of computing device 110, or a memory of server 130. As an example, data cache 320 may be a folder stored within memory 220 containing a collection of cached data associated with a web browser application executed on computing device 110. Data cache 320 may have a set size or a size limit. Accessing data cache 320 may include retrieving all or a portion of any data stored in the cache 320.

At step 430, process 400 may include determining whether the data cache 320 includes any data. If the cache 320 is empty, process 400 may proceed to step 431.

If cache 320 is determined to be not be empty in step 430, process 400 may proceed to step 440. At step 440, process 400 may include determining whether the requested content is present in the cache 320. For example, if the accessed cache 320 is a web browser cache, the cache may contain data related to other webpages, but may not contain any data related to the webpage related to the request at step 410. If the cache 320 does not include the requested data, process 400 may proceed to step 431 to determine whether the cache 320 should be loaded with additional data. If the cache 320 does include the requested data content, process 400 may proceed to step 450 and retrieve the data from the cache 320. While depicted in FIG. 4 as two operations, in some embodiments, steps 430 and 440 may be executed in a single operation.

At step 431, process 400 may include determining whether database includes the requested data and whether all data from the database has been loaded. Determining whether the database includes the requested data may include receiving an indication from server 130 that the database does not include the requested data. If the database does not include any of the requested data or the database does not include any additional data that has not already been loaded, process 400 may end at step 432.

If all of the database data has not been loaded and the database contains at least some of the requested data, process 400 may proceed to step 433. At step 433, process 400 may include retrieving at least a portion of the requested data content and loading it into the cache 320. Retrieving the requested data may include receiving the requested data from database 140 or server 130 in response to a query or request for the data. Consistent with disclosed embodiments, the query or request may include a reference to specific data. For example, the request may include reference to a specific video file or portion of a specific video file to be streamed. In some embodiments, the query or request may include a generic reference to data using a chunk size and number of data chunks. For example, when the chunk size is twenty records and the number of data chunks is three, the first sixty records stored in the database may be requested. Once some or all of the requested data is received, step 433 may include loading the received data into the cache 320 for future use. Continuing the example from FIGS. 3A and 3B described above, the three data chunks of twenty records 331-333 received from the database may be loaded into cache 320.

In some embodiments, step 433 may also include clearing a part or all of the cache. For example, if the cache 320 is full and new data content is retrieved from the database, the old contents of the cache may need to be evicted before the new content can be saved to the cache. Similarly, the previous contents of the cache 320 may be overwritten by the newly retrieved data. In other embodiments, only a portion of the cache may be cleared or overwritten. For example, the cache 320 may be cleared except for data chunks that have not yet been provided for consumption. As another example, all data chunks in the cache may be overwritten except for the data chunk that is the latest in a series of data.

At step 450, process 400 may include retrieving or fetching the requested data content from the cache 320. Fetching the requested data from the cache may include accessing the cache and loading at least some of the data contents. In some embodiments, only a portion of the data may be retrieved from the cache 320. Continuing the example of FIGS. 3A and 3B, if the cache has three data chunks, rather than retrieve all three data chunks at once, just the first chunk 331, containing records R1-R20, may be retrieved. In some embodiments, as data is retrieved from the cache, it may be removed from the cache 320. In other embodiments, data may remain in the cache 320 until the data is cleared from the cache or overwritten, even if the data is retrieved for consumption.

At step 460, process 400 may include providing at least a portion of the retrieved data for consumption. Providing data may include displaying the data to a user, loading the data into a form or web browser, playing a video, providing the data as input to another application or process, or other forms of supplying data to a user, another device, an application, or another process. For example, providing data may include displaying a video to the user. As another example, providing data may include sending the data to a command line interface process for analysis. As yet another example, providing data may include displaying the retrieved data in a web browser window, as illustrated by FIGS. 5 and 6.

Figure 5:
FIG. 5 is an illustration of an exemplary user interface for user data consumption, consistent with disclosed embodiments.

FIG. 5 is an illustration of an exemplary user interface for user data consumption, consistent with disclosed embodiments. Exemplary web browser window 500 may display one or more data records retrieved from cache 320. For example, at step 450 of process 400, the web browser may fetch the first data chunk from the cache that has not yet been provided. In the case of this example, this may be data chunk 331, containing records R1-R20. Then, as illustrated by FIG. 5, a portion of the records of data chunk 331 may be provided to the user by displaying the records within the web browser window. In some cases, as shown in FIG. 5, only a portion of a data chunk may be able to be provided at a time. For example, in window 500, only ten records may be displayed once. Accordingly, the first records of the data chunk 331 (R1-R10) may be displayed. Then, for example, as the user scrolls down the web page, additional remaining records of data chunk 331 may be displayed, as illustrated by FIG. 6.

Figure 6:
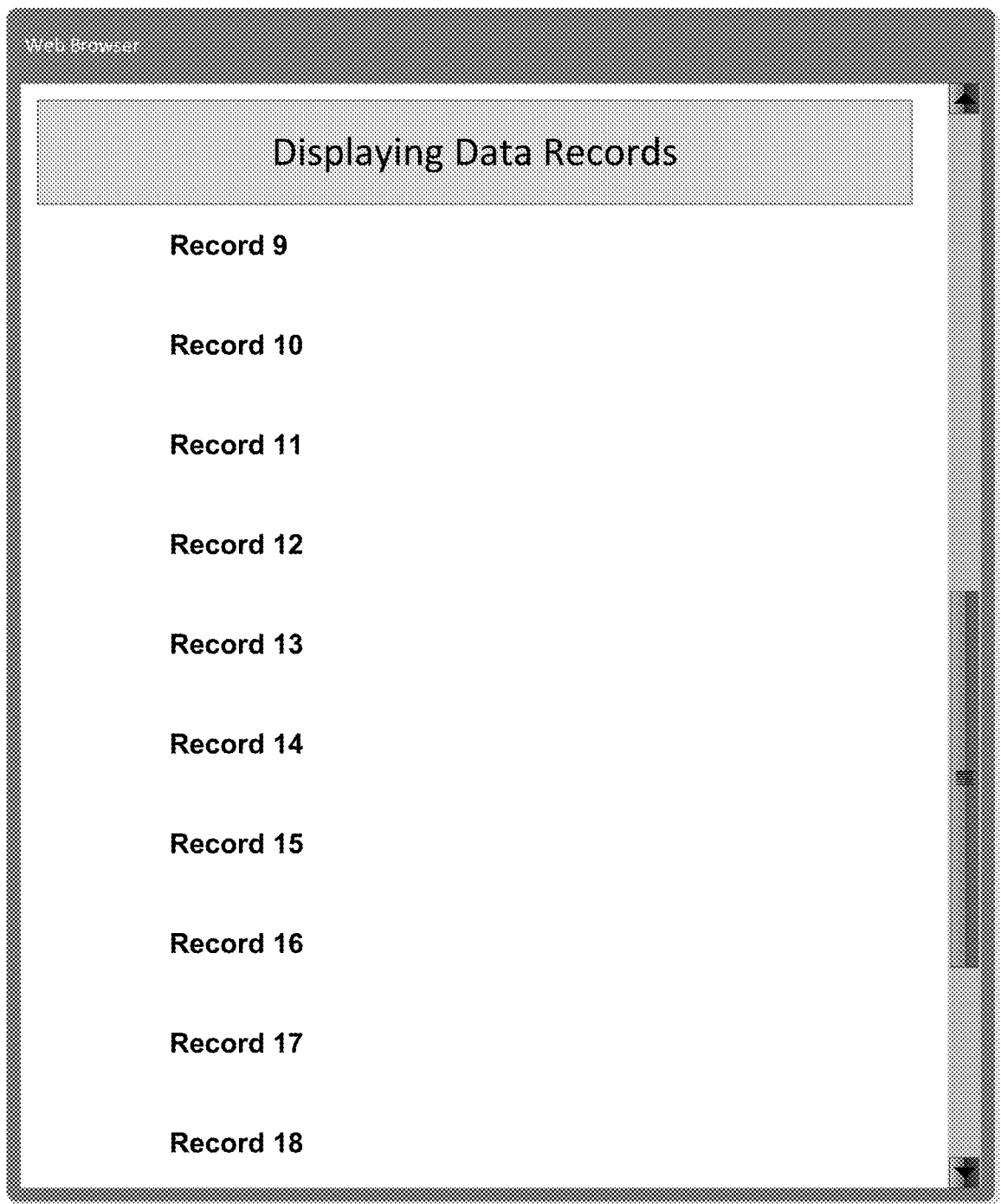
FIG. 6 is an illustration of an exemplary user interface for user data consumption, consistent with disclosed embodiments.

FIG. 6 is an illustration of an exemplary user interface for user data consumption, consistent with disclosed embodiments. As with window 500 of FIG. 5, window 600 of FIG. 6 may be limited to displaying ten records. Thus, a user presented with window 500 may scroll down and be presented with records 9-18, as illustrated by FIG. 6.

While FIGS. 5 and 6 illustrate data consumption as occurring within a webpage of a web browser, other forms of data consumption are possible. For example, consumption may occur as part of a command line interface process for data retrieval. A command line interface process may run to analyze a large amount of data from a server or database. Rather than fetch all of the data needed for the process at once, process 400 may be implemented to retrieve the needed data over time, without slowing down the execution of the process. As another example, consumption may occur as part of a multimedia streaming process. As described herein, a user may stream a video file. Rather than download the entire file, or fetch and cache data from the streaming server when no data is remaining in the cache, process 400 may be implemented to continuously reload the cache as needed while also reducing lag time.

At step 470, process 400 may include determining if a consumption threshold has been reached. A consumption threshold may be manually defined or automatically. In some embodiments, the consumption threshold may be dynamically variable. The consumption threshold may relate to an amount of provided data consumed by a user, application, or process. The chunk threshold may be determined based on the data chunk size, number of data chunks retrieved from the database, type of data being provided, the way in which the data is provided or consumed, the data-consuming entity (e.g., a human user, an application, an automated process, etc.), speed, bandwidth, or strength of a connection with the database or server 130, speed, bandwidth, or strength of a connection used for consumption, cache size, or other factors. These factors may be used to determine an initial chunk threshold, or in some cases used to update a previously defined threshold. For example, if computing device 110 has a weak or slow connection with server 130, the consumption threshold may be lower. A lower consumption threshold may facilitate the presentation of more data in a shorter period of time, but may also lead to the cache being reloaded more frequently. Loading the cache more frequently may help reduce lag time because rather than requesting a large amount of data at one time over a slow connection, the data requests will be more spread out. This may permit the consumption of previously cached data while new data is being cached.

For example, a user may consume provided data by viewing displayed data entries and scrolling through additional entries. With reference to FIG. 5, when data records 1-10 are displayed in window 500, process 400 may include determining that data records 1-10 have been consumed. Similarly, if a user scrolls down, causing records 9-18 to be displayed, it may now be determined that records 1-18 have been consumed. The consumption threshold may define a minimum amount of data (for example, number of data entries, amount of time of a video or audio file, number of data files, or others) consumed before, for example, another data chunk will be retrieved from the cache and provided.

Accordingly, step 470 may include monitoring the consumption of the provided data. Monitoring consumption of data may include monitoring scrolling activity in a webpage or application, tracking a duration of streamed data content, tracking an amount of data provided, or other ways of tracking an amount of data consumed. For example, the threshold may be met if the user performs enough scrolling within the webpage displaying the data. As another example, if a user is viewing a video, the threshold may be met if a sufficient amount of time has elapsed in the video. If the amount of consumed data does not meet or exceed the consumption threshold, process 400 may loop back to step 460 and continue to provide the data retrieved from the cache until the consumption threshold is reached. If the consumption threshold is met, process 400 may proceed to step 480.

At step 480, process 400 may include determining if a data chunk threshold has been reached. The data chunk threshold may define a minimum number of data chunks or amount of data (for example, number of data entries, amount of time of a video or audio file, number of data files, or others) provided before, for example, new data chunks will be retrieved from the database and loaded into the cache. The chunk threshold may be manually defined or automatically defined. In some embodiments, the data chunk threshold may be dynamically variable. The chunk threshold may be determined based on the data chunk size, number of data chunks retrieved from the database, type of data being provided, the way in which the data is provided, the data-consuming entity (e.g., a human user, an application, an automated process, etc.), speed, bandwidth, or strength of a connection with the database or server 130, speed, bandwidth, or strength of a connection used for consumption, cache size, or other factors. These factors may be used to determine an initial chunk threshold, or in some cases used to update a previously defined threshold. For example, if computing device 110 has a weak or slow connection with server 130, the chunk threshold may be lower. A lower chunk threshold may facilitate the presentation of more data in a shorter period of time, but may also lead to the cache being reloaded more frequently. Loading the cache more frequently may help reduce lag time because rather than requesting a large amount of data at one time over a slow connection, the data requests will be more spread out over time. This may permit the consumption of previously cached data while new data is being cached. Similarly, as another example, larger caches may benefit from a higher threshold because the larger cache may not need to be updated as frequently as smaller caches.

In some cases, the chunk threshold may be set to be less than the number of data chunks received or defined at step 410. Using the chunk threshold, in combination with chunking the retrieved data, may permit more efficient data communications and reduce lag time by only requesting new data when a certain amount of previous data has been consumed. By loading the data into the cache in multiple chunks, lag time may be reduced by limiting the number of data requests to the database and by preemptively loading the cache to ensure that the next chunk of data to be provided is already located in the cache. If the next chunk of data to be provided is already loaded in the cache, there will be no lag time to account for sending a request to the database to retrieve the next data chunk, receive the data, and load the data into the cache.

Accordingly, process 400 may include monitoring the number of data chunks consumed. Then, at step 480, if the data chunk threshold is not met, process 400 may loop back to step 450 to retrieve the next data chunk from the cache. Process 400 may then proceed as described above to provide the retrieved data chunk and monitor the consumption of the data. If the data chunk threshold is met (which may indicate that, for example, only one unprovided data chunk remains in the cache), then process 400 may proceed to step 490.

In some embodiments, process 400 may include both steps 470 and 480, as illustrated in FIG. 4. In other embodiments, process 400 may include just one of steps 470 or 480. In further embodiments, steps 470 and 480 may be combined into a single step. As an example, process 400 may be configured to retrieve all cached data chunks at step 450. Then, at step 460, all of the cached data chunks may be provided. In such a case, step 480 may be collapsed into step 470 because when the consumption threshold is reached, new data may need to be loaded into the cache. Thus, according to this example, when the consumption threshold is reached, process 400 may proceed back to step 431 to determine if there is additional data in the database to be provided. As another example, process 400 may be executed such that when data is retrieved from the cache at 450, it is removed from the cache. In such a case, rather than track the amount of data actually consumed at step 470, process 400 may instead track the amount of data remaining in the cache. Then, when the amount of data remaining in the cache drops below a threshold amount, process 400 may proceed to step 490 and update the indication of data content. Similarly, a threshold may be defined that tracks whether the data cache is full. If the cache is not full, process 400 may proceed to step 490 to update the indication of data content, and eventually fill the cache.

At step 490, process 400 may include updating the indication of data content. Updating the indication may include receiving or generating an updated indication of requested data, an updated data starting point, updated data chunk size, and updated number of data chunks. In embodiments in which process 400 is executed by a dedicated application or device, the dedicated application or device may request or receive an updated indication from the data-consuming application or device. In other embodiments, process 400 may include generating an updated indication of requested data, which may later be used to request additional data content from server 130 or database 140.

The updated indication may include an updated data starting point. The updated starting point may be generated based on the prior starting point, the chunk size, and the number of chunks. For example, if the data being provided is a video file the original start point may have been at the beginning of the file, or zero seconds. If three data chunks, each of ten second duration were previously retrieved from the database, then the first thirty seconds of video may have been previously loaded into the cache. Accordingly, the new updated starting point may be the thirty-second mark of the video. As another example, the provided data may be data with a chunk size of a single data file. The initial starting point may have been the first file in a list or a specific file within the database, and three files may have been loaded (i.e., the number of chunks was three). In such an instance, the updated starting point may be the fourth file in the list.

The updated indication may include updated values for the data chunk size and number of data chunks. In some embodiments, the updated values for the data chunk size and number of data chunks may be the same as the original values of the indication at step 410. In other words, the data chunk size and number of data chunks may not change in the updated indication. In other embodiments, the values for chunk size and number of chunks may increase or decrease, based on one or more of the factors described above with respect to step 410, as well as FIG. 3B.

In some embodiments, step 490 may also include retrieving remaining data from the cache and providing the retrieved remaining data for consumption. For example, if the data chunk threshold is set such that when the chunk threshold is reached, there is one remaining data chunk in the cache, at step 490, process 400 may include providing this last remaining chunk in the cache. In other words, if the chunk threshold is reached at step 480, while process 400 may proceed to step 490, it may also loop back to step 450 to retrieve the next chunk from the cache and provide it for consumption. While that is occurring, process 400 may then also update the indication and proceed to step 431 to determine if there is additional data to be loaded from the database.

After step 490, process 400 may loop back to step 431 to determine if all data from the database has been loaded, as described above in the earlier discussion of this step. If not all the database data has been loaded, process 400 may then proceed to step 433 to retrieve the data content indicated in the updated indication of data content from step 490. The process then may continue to loop through various iterations of the steps as described above and depicted in FIG. 4.

Various potential use cases of the disclosed embodiments are described below. It is understood that these use cases are provided by way of example only and are not limiting of the present disclosure.

One potential implementation may be to facilitate display of data within a webpage. For example, using computing device 110, a user may use a web browser to load a webpage including a table with a large amount of data. The data within the table may be received by computing device 110 from server 130. Server 130 may manage the website and be in communication with database 140 that stores the tabular data. While the page is loading, computing device 110 may implement a process for seamless resource consumption with efficient caching. The process may be implemented using a standalone application, or may be implemented through the web browser using the processor of computing device 110. The process may start by identifying the data content to be loaded into the table, a data chunk size (for example, twenty records) and a data chunk number (for example, three).

Computing device 110 may then access the cache and determine if the cache is empty, or if the requested data is in the cache. If the requested data is not in the cache, computing device 110 may then send a request for the data to server 130. For example, the request may indicate that the first 60 records of the table (the first three data chunks at twenty records per chunk) should be sent to computing device 110. Upon receiving the first 60 records, the computing device 110 may load first chunk (records 1-20) into the web page data table, but only 10 of the records may be visible at one time. Accordingly, computing device 110 may monitor the user's consumption of the data by tracking the user's scrolling within the web page. Computing device 110 may also set a consumption threshold based on the chunk size and type of data. For example, the consumption threshold may be fifteen records. If the user scrolls sufficiently to cause record 15 to be visible, the records 1-15 may be deemed consumed by the user and the next data chunk (records 21-40) may be loaded from the cache into the table.

Computing device 110 may also monitor the number of chunks loaded and/or the number of not loaded data chunks remaining in the cache and compare the number to a chunk threshold. In this case, the chunk threshold may be defined as two chunks. Thus, after the second chunk is loaded and consumed, the chunk threshold may be met and the next three data chunks (records 61-120) may be retrieved from the web server 130 and saved in the cache, while the user is consuming the third data chunk. Thus, by loading the cache with new data while the user is still consuming previously cached data, the lag time experienced by the user in loading new data may be greatly reduced.

Another possible implementation is to facilitate more efficient requesting and caching of data by a command line interface ("CLI") process. The CLI process may be configured to analyze a large amount of data records. Rather than fetch all of the data records at one time from, for example, server 130, the CLI process may implement a seamless resource consumption process to retrieve the needed data over a longer period of time, without slowing down the execution of the process. The CLI process may include analyzing a series of files. Thus, a data chunk size of 1 file may be used. Similarly, a number of data chunks may be determined based on, for example, the average length of time needed for the analysis of a file, the size of the cache, the average file size, and the speed or strength of the connection between the computing device executing the CLI process and server 130, etc. Using those considerations, the number of data chunks may be determined to be five. Accordingly, the device executing the process may request from server 130 the first five files (e.g., Files 1-5) in the group of files to be analyzed. Upon receiving those files, the computing device may cache the files and load the first one to begin analyzing it. Upon loading a file from the cache to be analyzed, it may be removed from the cache. Accordingly, the process may also monitor the number of files in the cache and compare it to a threshold number, for example two files. Thus, when the number of files reaches or drops below two files, the next chunk of files may be requested from server 130 (e.g., Files 6-10). Thus, by loading the cache with new files while the CLI process is still analyzing a previously cached file, the lag time experienced by the CLI process in receiving new files may be greatly reduced.

In yet another potential implementation, a process for efficient caching and seamless resource consumption may be implemented to reduce lag time and increase the experience of a user streaming multimedia content. For example, using computing device 110, a user may use an application to stream a movie from an online streaming service. Server 130 may manage the service and be in communication with database 140 that stores the data for the movie file. Rather than download the entire file, or fetch and cache data from the streaming server only when no data is remaining in the cache, computing device 110 may use disclosed embodiments to continuously reload the cache as needed while also reducing lag time. The process may start by identifying the data content (i.e., the movie to be streamed), a data chunk size (for example, thirty seconds of the movie) and a data chunk number (for example, four chunks).

Computing device 110 may then access the cache and determine if the cache is empty, or if the requested data is in the cache. If the requested data is not in the cache, computing device 110 may then send a request for the movie data to server 130. For example, the request may indicate that the data comprising the first two minutes of the movie (the first four data chunks at thirty seconds per chunk) should be sent to computing device 110. Upon receiving the first four chunks, the computing device 110 may begin playing the first chunk (the first thirty seconds) to display to the user. Computing device 110 may monitor the user's consumption of the data by tracking the time duration of playback of the movie file. Computing device 110 may also set a consumption threshold based on the chunk size and type of data. Here, the consumption threshold may be thirty seconds, the same as the chunk size. Once the first thirty seconds have played, the second chunk (seconds 31-60) may be loaded from the cache and displayed.

Computing device 110 may also monitor the number of chunks loaded and/or the number of not loaded data chunks remaining in the cache and compare the number to a chunk threshold. In this case, the chunk threshold may be defined as three chunks. Thus, after the third chunk is loaded and displayed, the chunk threshold may be met and the next three data chunks (seconds 121-240) may be retrieved from the web server 130 and saved in the cache, while the user is watching the fourth data chunk. Thus, by loading the cache with new data while the user is still consuming the previously cached portion of the movie, the lag time experienced by the user in loading the next portion of the movie may be greatly reduced or eliminated.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for reducing lag time for progressive consumption of data content, the operations comprising:
   receiving an indication of requested data content, the indication comprising:
      a data chunk size, and
      a number of data chunks to fetch;
   accessing, in response to the indication, a data content cache;
   performing a fetching operation comprising at least one of:
      if the data content cache is empty, obtaining at least a first portion of the requested data content from a content database, or
      if the data content cache is not empty, determining that at least the first portion of the requested data content is available in the data content cache;
   providing for consumption, based on the fetching operation, at least the first portion of the requested data content;
   identifying that a threshold has been reached based on the consumption;
   receiving, based on the identification that the threshold has been reached, updated values for the data chunk size and the number of data chunks to fetch;
   performing the fetching operation again based on the updated values; and
   providing for consumption, based on the fetching operation performed again, at least a second portion of the requested data content.

2. The non-transitory computer readable medium of claim 1, wherein the data chunk size is expressed by at least one of: file size or duration.

3. The non-transitory computer readable medium of claim 1, wherein the threshold is reached based on scrolling activity in a webpage or application.

4. The non-transitory computer readable medium of claim 1, wherein the threshold is reached based on a streaming duration.

5. The non-transitory computer readable medium of claim 1, wherein the consumption occurs in a webpage.

6. The non-transitory computer readable medium of claim 1, wherein the consumption occurs as part of a command line interface process for data retrieval.

7. The non-transitory computer readable medium of claim 1, wherein the consumption occurs as part of a multimedia streaming process.

8. The non-transitory computer readable medium of claim 1, wherein the threshold is determined to be reached based on whether the data content cache is full.

9. The non-transitory computer readable medium of claim 1, wherein the threshold is determined to be reached based on a number of data chunks remaining in the data content cache.

10. The non-transitory computer readable medium of claim 1, wherein the threshold is variable based at least in part on a connection strength used for the consumption.

11. A computer-implemented method for reducing lag time for progressive consumption of data content, the method comprising:
receiving an indication of requested data content, the indication comprising:
a data chunk size, and
a number of data chunks to fetch;
accessing, in response to the indication, a data content cache;
performing a fetching operation comprising at least one of:
if the data content cache is empty, obtaining at least a first portion of the requested data content from a content database, or
if the data content cache is not empty, determining that at least the first portion of the requested data content is available in the data content cache;
providing for consumption, based on the fetching operation, at least the first portion of the requested data content;
identifying that a threshold has been reached based on the consumption;
receiving, based on the identification that the threshold has been reached, updated values for the data chunk size and the number of data chunks to fetch;
performing the fetching operation again based on the updated values; and
providing for consumption, based on the fetching operation performed again, at least a second portion of the requested data content.

12. The computer-implemented method of claim 11, wherein the data chunk size is expressed by at least one of: file size or duration.

13. The computer-implemented method of claim 11, wherein the threshold is reached based on scrolling activity in a webpage or application.

14. The computer-implemented method of claim 11, wherein the threshold is reached based on a streaming duration.

15. The computer-implemented method of claim 11, wherein the consumption occurs in a webpage.

16. The computer-implemented method of claim 11, wherein the consumption occurs as part of a command line interface process for data retrieval.

17. The computer-implemented method of claim 11, wherein the consumption occurs as part of a multimedia streaming process.

18. The computer-implemented method of claim 11, wherein the threshold is determined to be reached based on a determination of whether the data content cache is full.

19. The computer-implemented method of claim 11, wherein the threshold is determined to be reached based on a number of data chunks remaining in the data content cache.

20. The computer-implemented method of claim 11, wherein the threshold is variable based at least in part on a connection strength used for the consumption.

\* \* \* \* \*